July 3, 1951 R. L. HENSON, JR 2,558,954
SEISMOGRAPHIC PROSPECTING APPARATUS
Filed Sept. 12, 1946
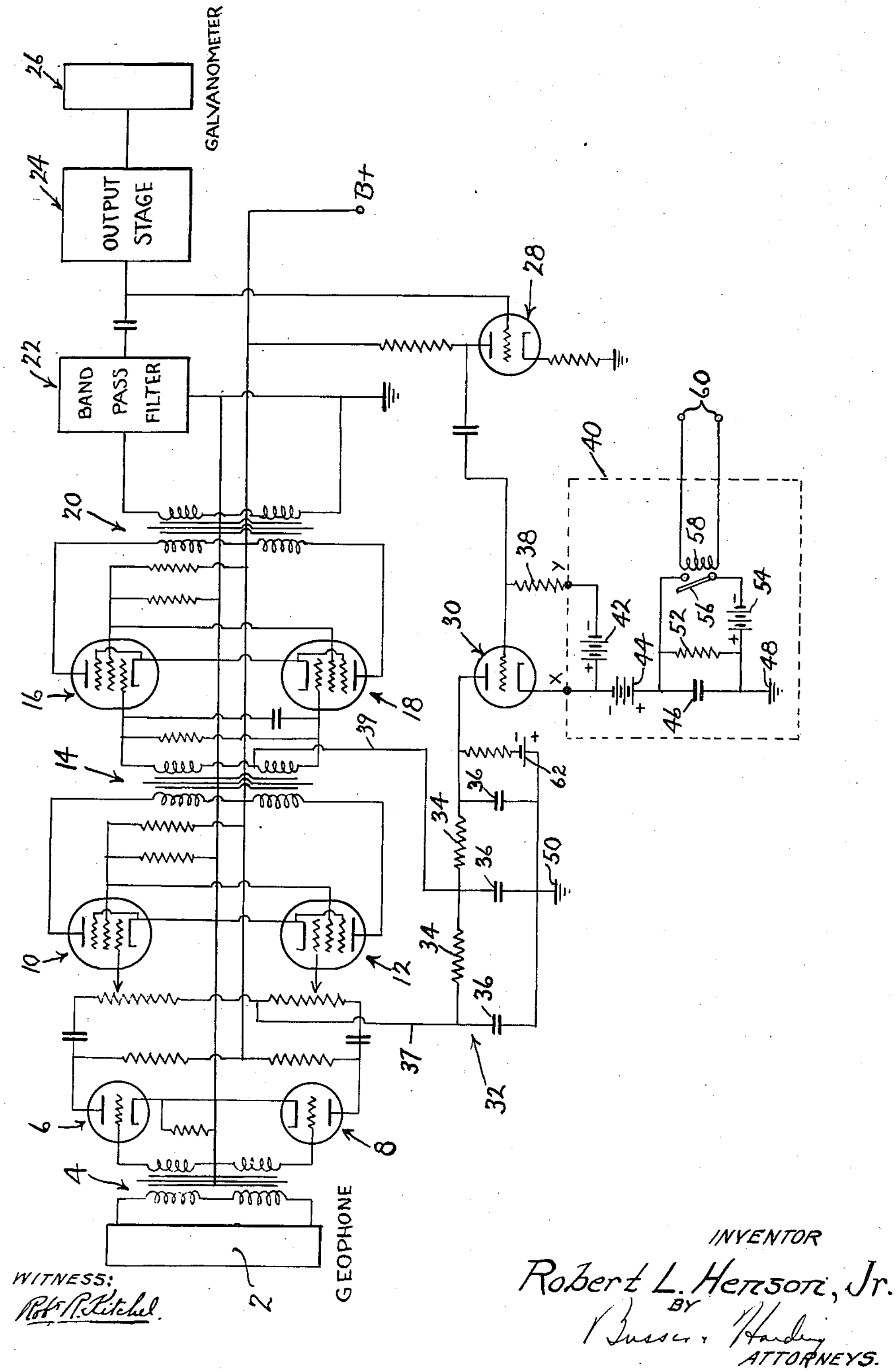
WITNESS:
Rob't R. Kitchel
INVENTOR
Robert L. Henson, Jr.
BY
Busser & Harding
ATTORNEYS.

Patented July 3, 1951

2,558,954

UNITED STATES PATENT OFFICE 2,558,954

SEISMOGRAPHIC PROSPECTING APPARATUS

Robert L. Henson, Jr., Beaumont, Tex., assignor to Sun Oil Company, Philadelphia, Pa., a corporation of New Jersey Application September 12, 1946, Serial No. 696,588

2 Claims. (Cl. 179—171)

This invention relates to seismographic prospecting apparatus and has particular reference to an automatic volume control circuit for seismograph amplifiers in which instability and overshoot are avoided.

Immediately following the shot instant in seismographic prospecting work a tremendous amount of control by automatic volume control is required, for example, to reduce the amplifier gain by a factor of 10,000. However, as the shot energy dies out the control by the automatic volume control is reduced until at the end of the record the amplifiers are operating at almost full gain and the sole function of the automatic volume control becomes the balancing of the amplitudes of the traces.

In accordance with the present invention an automatic volume control arrangement is provided in such fashion that stability of the circuit is maintained while, at the same time, the proper action of the automatic volume control is secured. In particular, while the controlling action is greatly reduced in the period immediately following the shot instant, nevertheless control is maintained even during periods long following the shot instant so that proper operation is attained.

The general objects of the invention indicated above as well as further objects relating to details of construction will become apparent from the following description read in conjunction with the accompanying drawing in which the figure is a wiring diagram illustrating a preferred embodiment of the invention.

There is indicated at 2 a seismometer or geophone which feeds through a transformer 4 the push-pull first input stage of an amplifier, the next two stages of which are indicated as comprising push-pull arrangements of remote control pentodes arranged in pairs as indicated at 10, 12, 16 and 18, transformer coupling being provided at 14 and 20. The output of the second pentode stage feeds a band pass filter of the conventional type to segregate the frequencies which are to be recorded, the recording galvanometer 26 being operated by a conventional output stage indicated at 24. The arrangement so far described represents the channel between one detector and its galvanometer.

It will be understood, of course, that in ordinary reflection shooting a series of detectors are used at proper locations and feed through their individual amplifying means additional galvanometer elements usually to produce on a single photographic record member a plurality of traces side by side, the relative characteristics of which will indicate the nature of the subterranean formations.

For the purpose of automatic volume control the amplifying circuit, preferably between the filter 22 and the output stage 24, feeds an amplifying tube 28, the output of which is delivered to the grid of a triode 30 acting as a rectifier to supply bias for the control grids of the pentode amplifiers. The tube 30 feeds a filter system indicated at 32 which may include as indicated a plurality of resistances 34 in series with shunting condensers 36 connected to ground. Connections 37 and 39 from the filter system provide the bias for the pentodes 10, 12, 16 and 18. The reduction of gain effected by the bias depends, as usual, upon the shift of the operating point on the tube characteristics, the gain being reduced as the bias causes the grids to become more negative.

The cathode of the triode 30 is connected to a terminal X and the grid of the triode is connected through a resistor 38 to a terminal Y. These terminals constitute the output terminals of a system indicated generally at 40 controlling a variation for bias applied to the pentodes of all of the various detector channels, it being understood that all of these have their corresponding connections to the terminals X and Y.

Bridging the terminals X and Y there is a battery 42 which provides the required negative bias of the grid of the triode 30. A battery 44 and a condenser 46 are between the terminal X and the ground 48. The condenser 46 is shunted by a resistance 52 and by a series arrangement of a battery 54 and the armature 56 of a relay 58, the terminal 60 of which is connected to the blasting machine in such fashion that the relay is opened at the instant the shot is fired.

The general operation of the system so far described will become apparent from consideration of what occurs following the firing of the shot.

Battery 42 provides sufficient negative bias to the grid of tube 30 to prevent the flow of plate current in that tube. Thus that tube is biased beyond cutoff with the result that plate current flows only when the grid signal is sufficiently positive to drive the grid beyond the threshold value. When no plate current flows in tube 30, the bias of the amplifying pentodes and consequently their gain is constant and is fixed by the potential of battery 62. When the grid signal on tube 30 exceeds the threshold value, plate current flows in that tube and produces a rectified output with the result that connections 37 and 39 become more negative with respect to ground. As a consequence, due to the remote control characteristics of the amplifying pentodes the amplification of the amplifier system is reduced.

Before the shot is fired the armature 56 is closed by reason of the energization of the relay 58 which may, for example, be in a closed circuit, a portion of which may take the form of one or more turns of wire surrounding the explosive charge.

When the armature 56 is closed it will be evident that a maximum voltage is applied between the plate and cathode of the tube 30 and consequently for any given signal on the grid of tube 30 exceeding the threshold value, the plate current flowing in tube 30 will be a maximum. This causes the negative bias on the grids of the amplifying pentodes to be a maximum and results in the gain of the amplifier being reduced by a maximum amount for a given signal on the grid of tube 30. Thus with the armature 56 closed, the automatic volume control will produce the maximum possible control of the amplifier gain. The amplifier gain at this time may then, for example, be reduced 10,000 times less than the full maximum gain of the system.

At the instant the shot is fired the armature 56 opens. At the instant of opening the condenser 46 is charged to the full potential which, due to current flow, produced by the battery 54, existed across the resistance 52. Now, however, discharge of this condenser takes place through the resistance 52 at a rate which is determined by the time constant of the circuit consisting of the condenser 46 and the resistance 52. With the lapse of time, therefore, the potential applied between the plate and cathode of tube 30 decreases with the result that for any given signal level on the grid of tube 30 exceeding the threshold value the plate current of tube 30 will also decrease. Consequently, the negative bias applied to the grids of the amplifying pentodes will also decrease with the result that the reduction in amplifier gain will decrease. In other words, beginning with the instant the shot is fired the amount of control produced by the automatic volume control is continually being decreased as the recording progresses. Due to the presence of the battery 44, however, the substantially complete discharge of the condenser 46 does not remove entirely the plate voltage of tube 30 and consequently the automatic volume control continues to function.

The advantages of the system may now be described in greater detail. One difficulty which arises with a feed-back type of automatic volume control as shown in the figure is the danger of instability caused by high gain around the feed-back loop. If this gain is sufficiently high the amplifier will motorboat. This condition can be prevented by decreasing the gain of the pentodes, increasing the filtering action of the filter 32 to remove to a greater extent the varying potentials of the output of this filter, or by decreasing the gain of the biased rectifier 30. Another difficulty with a feed-back type of automatic volume control may result when the control action is very great. If a signal is applied to the amplifier near full gain condition the output of the rectifier overshoots and applies too much bias to the pentodes causing the amplifier output to be too small until the automatic volume control can recover. In the present circuit both instability and overshoot are avoided.

Following the detonation of the explosive charge the output of the detector increases very rapidly to a maximum and then decreases more slowly to zero. The maximum output of the detector may be as high as 10,000 times its minimum useable value. If the amplifier output is to be held constant the automatic volume control must, at the time of maximum output, reduce the amplifier gain by 10,000 times.

However, as the shot energy dies out the output of the detector decreases and the control required of the automatic volume control is reduced until at the end of the record the sole function of the automatic volume control is to balance the outputs of the amplifiers. If the control is reduced as described by allowing the plate voltage of the biased rectifier 30 to decrease as a function of time then two ends are accomplished. Decreasing the plate voltage will decrease the gain of the rectifier at a time when the gain of the pentodes is maximum. This will decrease the gain around the automatic volume control loop and will prevent instability. Decreasing the plate voltage also decreases the control of the automatic volume control when the amplifier gain is high and thus prevents overshoot. It is to be noted that the grid bias of the tube 30 is maintained constant by the battery 42 so that the gain of the tube 30 is reduced as its plate voltage is reduced.

The battery 44 prevents decrease of the plate voltage to zero and consequently maintains the automatic volume control in operation so as to control the amplitudes of the trailing signals from the detector.

The circuit has the additional important advantage of allowing the controlled output level to increase slightly as the record progresses. This increase tends to compensate for the decrease in amplitude which is fundamental in a feed-back type of automatic volume control. The increase in output level is a result of decreasing the plate voltage of the rectifier which, in turn, changes the operating point of the rectifier in such a manner as to increase the threshold level. Another advantage of this circuit is that it assures a higher amplifier gain at the end of the record because the automatic volume control action has been reduced.

As indicated above the circuit has the further advantage in that by the indicated arrangement of the system 40 this voltage changing system may be a common one for a series of amplifiers. Thus there is no necessity for providing separate timing circuits, batteries and relays for the various channels.

It will be clear that variations of the details of the circuit may be adopted without departing from the scope of the invention as defined in the following claims.

What I claim and desire to protect by Letters Patent is:

1. An amplifier for the output of a seismic detector including variable gain amplifying means, and means for controlling the gain of said amplifying means, the last mentioned means comprising a filter for providing a direct bias to said amplifying means, said filter having a pair of input terminals, a conducting path permanently connecting said input terminals, a grid-controlled thermionic tube having its anode connected to one of said terminals, and having its cathode connected to the other of said terminals through a time-variable network, said network comprising a fixed source of potential and, in series with said fixed source of potential, a parallel arrangement of a condenser and resistor, a potential source for charging said condenser, switching means for disconnecting the last mentioned potential source from charging relationship with said condenser, so that said condenser may discharge through said resistor, and means connecting the grid of said thermionic tube to the output of said amplifier.

2. An amplifier for the output of a seismic detector including variable gain amplifying means, and means for controlling the gain of said amplifying means, the last mentioned means comprising a filter for providing a direct bias to said amplifying means, said filter having a pair of input terminals, a conducting path permanently connecting said input terminals, a grid-controlled thermionic tube having its anode connected to one of said terminals, and having its cathode connected to the other of said terminals through a time-variable network, said network comprising a fixed source of potential and, in series with said fixed source of potential, a parallel arrangement of a condenser and resistor, a potential source for charging said condenser, switching means responsive to the firing of a shot for disconnecting the last mentioned potential source from charging relationship with said condenser, so that said condenser may discharge through said resistor, and means connecting the grid of said thermionic tube to the output of said amplifier.

ROBERT L. HENSON, Jr.

REFERENCES CITED

The following references are of record in the file of this patent:

UNITED STATES PATENTS

| Number | Name | Date |
|---|---|---|
| Re. 22,535 | Shimek | Aug. 22, 1944 |
| 2,303,357 | Hoover | Dec. 1, 1942 |
| 2,303,358 | Hoover | Dec. 1, 1942 |
| 2,307,790 | Hoover | Jan. 12, 1943 |
| 2,318,624 | Petty et al. | May 11, 1943 |
| 2,352,494 | Parr | June 27, 1944 |
| 2,352,825 | Fay | July 4, 1944 |
| 2,354,420 | Minton | July 25, 1944 |
| 2,374,204 | Hoover, Jr. | Apr. 24, 1945 |
| 2,390,322 | Parr | Dec. 4, 1945 |